United States Patent [19]

Matsuoka et al.

[11] Patent Number: 5,630,240
[45] Date of Patent: May 20, 1997

[54] CUSHION BODY STRUCTURE COMFORTABLE TO SIT

[76] Inventors: Chikara Matsuoka, 33-15, Wada 3-chome, Tamano City, Okayama Prefecture 706; Takeshi Watadani, 564-A302, Kojima-Hiedacho, Kurashiki City, Okayama Prefecture 711; Kunihisa Wakimoto, 919-4, Kawairi, Okayama City, Okayama Prefecture 701-01; Yukihiro Kinoshita, 4021-1, Tamashima-Michiguchi, Kurashiki City, Okayama Prefecture 713, all of Japan

[21] Appl. No.: 446,785
[22] PCT Filed: Apr. 25, 1994
[86] PCT No.: PCT/JP94/00685
§ 371 Date: Jun. 9, 1995
§ 102(e) Date: Jun. 9, 1995
[87] PCT Pub. No.: WO95/08508
PCT Pub. Date: Mar. 3, 1995

[30] Foreign Application Priority Data

Sep. 19, 1993 [JP] Japan .................. 5-254799

[51] Int. Cl.⁶ .................................................. A47C 27/14
[52] U.S. Cl. .................. 5/653; 5/655.9; 5/740; 297/452.27; 297/452.25
[58] Field of Search ................. 5/464, 481, 653, 5/740, 655.9; 297/452.25, 452.26, 452.27

[56] References Cited

U.S. PATENT DOCUMENTS

| | | | |
|---|---|---|---|
| 3,527,149 | 9/1970 | Fruchte et al. | 297/452.27 |
| 4,571,763 | 2/1986 | Suzuyama et al. | |
| 4,699,427 | 10/1987 | Kobayashi | 297/452.27 X |
| 4,784,437 | 11/1988 | Shimada | 297/452.27 X |
| 4,813,738 | 3/1989 | Ito | 297/452.27 X |
| 4,867,508 | 9/1989 | Urai | 5/481 X |

FOREIGN PATENT DOCUMENTS 57-45658   9/1982   Japan .................. 5/481

*Primary Examiner*—Michael F. Trettel
*Attorney, Agent, or Firm*—Renner, Kenner, Greive, Bobak, Taylor & Weber

[57] ABSTRACT

In a cushion body structure of a car seat, which is made by fastening a skin material to a cushion material by using a planar fastening material, an impregnation layer made of a foamed body is not produced. In the cushion body structure, a planar fastening body (4) is integrally molded with a cushion material by shielding and clamping walls (22, 23) for preventing entry of a foaming solution in a molding die (20) of the cushion material (2,3), so that an opening is provided between the periphery of the planar fastening body and the side (3) of the cushion material, and a non-impregnation layer (7) is formed in the periphery.

11 Claims, 2 Drawing Sheets

CUSHION BODY STRUCTURE COMFORTABLE TO SIT

TECHNICAL FIELD

The present invention relates to a cushion body structure of a car seat and in particular, relates to a cushion body structure that is comfortable to sit on, in which a car seat is made by connecting a skin material to a cushion material through a planar fastening body having an impregnation layer which avoids a feeling of hard and physical discomfort on the periphery of the surface fastening body.

BACKGROUND OF THE ART

Several methods for attaching a cushion material (a foamed body) structure to a body portion of a car seat with a skin material attached on its surface have been known and used in public, specifically as a method of attaching a skin material to the cushion material in a concave surface shape to secure the concave surface shape of a seating part of the seat. In the prior art, a method of adhering a whole back surface of the skin over a surface of the cushion material and a method such as an integral molding method of injecting urethane into a cushion material molding die by setting a skin material therein have been often used. However, in either method, their own production systems for carrying out such methods are required, and it is difficult to install such systems in a continuous assembly line, thereby increasing the cost for transferring and manipulating materials. Also, such a method in the prior art is a mass production system and it is thus required to maintain its operation rate. However, it is difficult to control a volume corresponding to a variation of the production rate. Thus, such a production method results in low productivity and causes a rise in cost. In order to avoid such disadvantages, a planar fastening material is used for attaching a surface material on cushioning material. This planar fastening material is called a planar fastener or planar fastening material. The planar fastening material is a knitted or textile base sheet containing a large number of hooked or ting-shaped small protrusions thereon. The hooked or ring-shaped small protrusions can be fixed to the skin by fastening to the back surface of the skin material and is found to be superior for its separating or shearing and attaching properties. However, if this planar fastening material is used for an integral molding in a cushion material molding die, in contrast with an advantage of means for fastening a skin material which is low cost, a disadvantage results which is an impregnation and hardening of the solution of the cushion material to a supporting material of the planar fastening material is caused. Specifically, while it is desirable to attach the side end of the planar material with a space which is slightly apart from the side portion of the cushion material, a hard impregnation layer is formed by impregnation of the solution of the cushion material into the planar fastening body, in particular, the periphery of the supporting material adjacent the space. This impregnation layer makes a feeling of physical discomfort for a person who sits thereon because it can be felt through a skin covering the cushion material and also it can be felt by touching and moving his or her body thereon.

Therefore, an object of the present invention is, in a cushion body structure of a car seat which is made by fastening a skin material to a cushion material through a planar fastening body connected by a supporting material having a constant thickness to a back surface of a planar fastening material, to provide a cushion body structure of a car seat comfortable to sit upon which is made by forming a nonimpregnation layer which does not absorb a foamed solution of the cushion material in the periphery of the planar fastening material and the supporting material positioned on its back surface.

DISCLOSURE OF THE INVENTION

For this, the present invention realizes a cushion body structure having a planar fastening body by using a molding die which is divided into an area for mounting the planar fastening body by a wall for preventing entry of the solution of the cushion material. The wall for preventing the entry is preferably comprised of a vertical wall having a length sufficient to obtain the thickness of the planar fastening body and a hooked portion bending inwardly from its tip and is provided vertically in the periphery of the area mounting the planar fastening body of a molding die, in particular, in both sides. By this, although the planar fastening body which is integrally molded with the cushion material has an opening between the side portion of the cushion material and it, the side end of the planar fastening body is formed as a non-impregnation layer which does not lose its softness.

The thickness of the supporting material constituting the planar fastening body, which is preferably made of a slab-urethane, is not specially limited and is 5–15 mm and preferably 10 mm thickness. The wall for preventing the entry is preferably made by having a length obtaining such a thickness and the hooked portion thereon.

In practice, the planar fastening body is mounted in a whole portion of the seat or an area corresponding to a least the center portion, so that the wall for preventing the entry is provided vertically in both sides of the area. A front end and a rear end of the planar fastening body crossing between both sides is shaped by directly contacting the body portion of the cushion material and impregnation. If the impregnation of the solution of the body portion of the cushion body is too large in the front end and the rear end, a similar wall for preventing the entry may be provided in a position dividing the front end and the rear end of the planar fastening body, but generally such can be done by walls for preventing entry at the front and rear ends which are thin and have a small height.

BEST MODE FOR CARRYING OUT THE INVENTION

Figure 1:
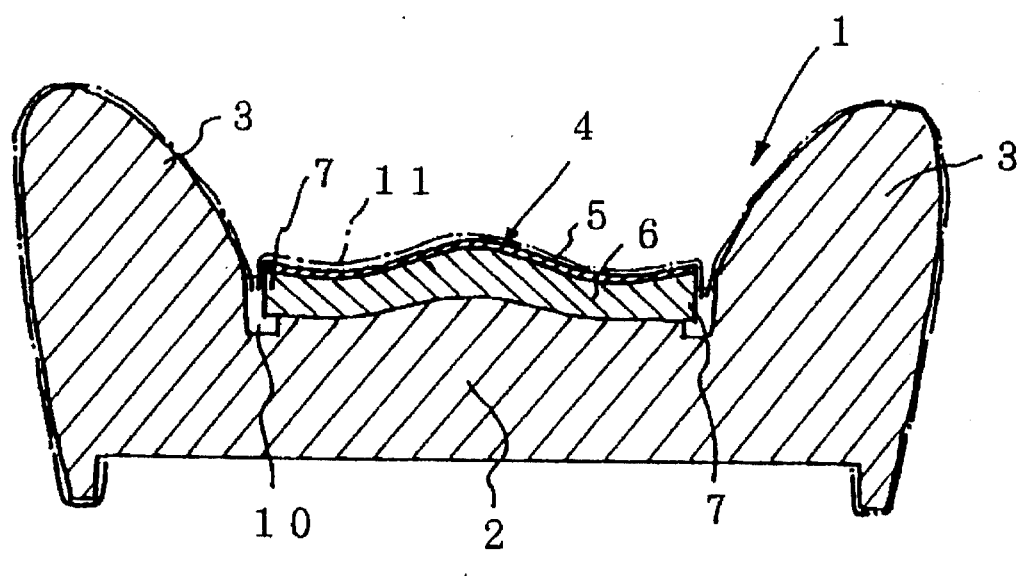
FIG. 1 is a cross-sectional end view showing a section of a cushion body structure having a good feeling for sitting, according to the present invention.

Referring to the drawings, an embodiment of the present invention is described. In addition, while the embodiment is illustrated only by an example providing a non-impregnation layer in both side ends of the planar fastening body, as mentioned above, it will be easily understood that such may be provided in the front and rear ends. A cushion body 1 of the present invention has a planar fastening body 4 connected to a cushion material body portion 2, as shown. A car seat is completed by covering with a skin material 11 shown by a dotted line on the cushion body 1. On both sides of the cushion material body portion 2 the side portions 3 are highly raised to structure a bucket shaped seat. The planar fastening body 4 is preferably a lamination layer made by bonding or fusing a slab-urethane as the supporting material 6 to the planar fastening material 5 such as a planar fastener as mentioned later. While there is a space (an opening) 10 between the cushion material side portions 3, 3 in both side ends of the planar fastening body 4, a non-impregnation layer 7 which is not impregnated with the foamed solution of the cushion material is formed in each end. Thus, a person who sits thereon does not feel a feeling of hard and physical discomfort as is experienced in a cushion body forming an impregnation layer according to the prior art.

Figure 3:
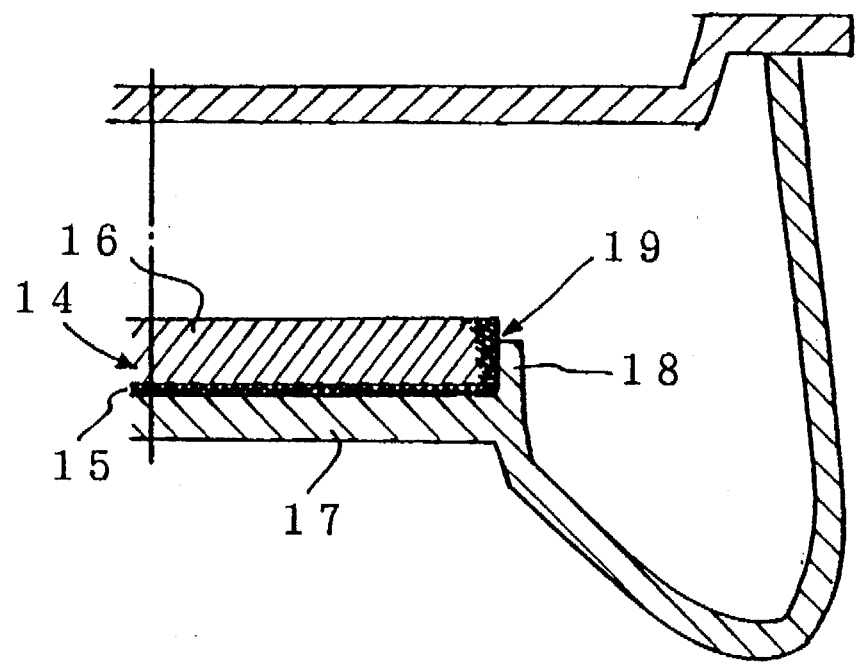
FIG. 3 is a differential sectional view of a molding die causing a nonconformity in the art.

Describing a technique for integrally molding a planar fastening body of the prior art to a cushion body with reference to FIG. 3, a planar fastening body 14 is mounted on a bottom surface 17 of a lower die of a molding die. This planar fastening body 14 is substantially the same as the planar fastening body of the present invention and is laminated of a slab-urethane as a supporting material 16 on a back surface of a planar fastening material 15. The planar fastening material 14 is mounted in a predetermined area on the bottom surface 17 and its end is typically stopped by a stopper 18 to bear an injection of the foamed solution of the cushion material. However, if the foamed solution is injected downwardly in this state, a part of it will impregnate through the side end of the supporting material (a slab-urethane) 16 so that a hard impregnation layer 19 is formed. The impregnation layer 19 is formed along both side portions of a seating surface of a seat and causes a feeling of hard and physical discomfort when a person who sits thereon touches it.

Figure 2:
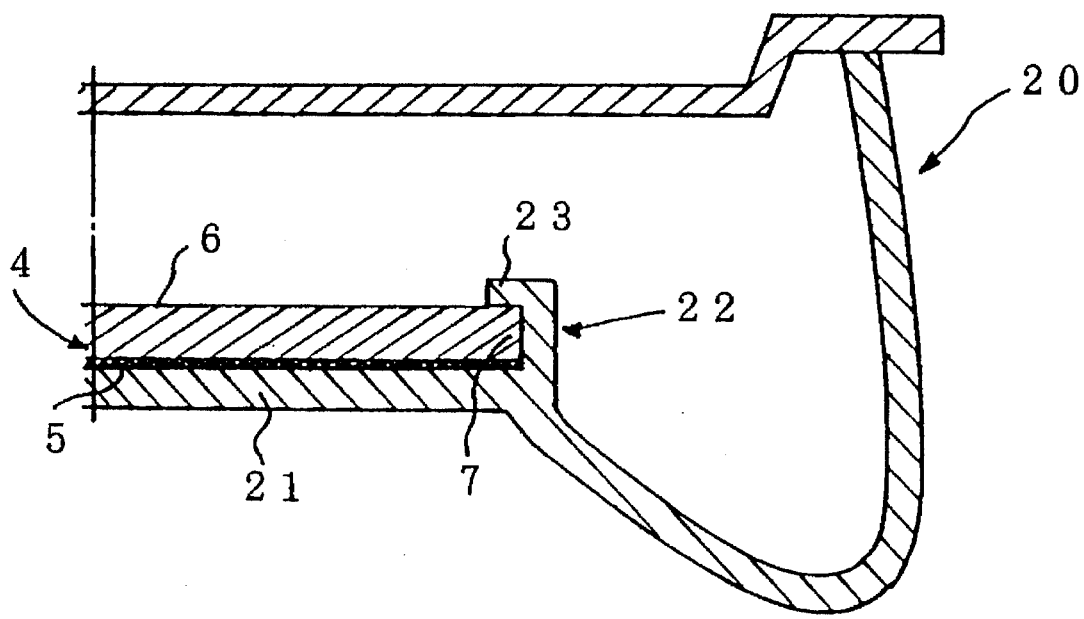
FIG. 2 is a fragmentary enlarged sectional end view of a molding die for molding a cushion body basically similar to a cushion body shown in FIG. 1.

Accordingly, in the present invention, in order to mold a cushion body structure for an excellent seat for comfortable sitting without forming such an impregnation layer, the planar fastening body 4 is integrally molded with the cushion body 1 by using a molding die as shown in FIG. 2. That is, a lower die 20 of the molding die of the present invention provides a vertical wall 22 for preventing the entry of a foamed solution in a position which divides an area mounting the planar fastening body 4 in substantially the center of its bottom surface 21. In addition, while the bottom surface 21 of the die shown in FIG. 2 represents a planar surface, it can be readily understood to design a curved surface shape corresponding to a three-dimensional curved surface shape shown in FIG. 1. Each wall 22 for preventing the entry dividing the area mounting the planar fastening body has a hooked portion 23 inwardly bent at the tip of the vertical wall 22. The length of the vertical wall 22 to the hooked portion is sufficient to obtain the thickness of the planar fastening body 4 and is typically 5–15 mm and preferably 10 mm. By setting the planar fastening body 4 in such a wall 22 for preventing the entry, injecting the solution of the urethane (not shown) downwardly from the upper portion of the molding die, while sealing the upper die and then foaming, the planar fastening body 4 is pressurized on the bottom surface 21 of the die and is connected to the cushion material body 2. The expanding foamed solution cannot enter the side end of the planar fastening body 4, thereby forming a non-impregnation layer 7 therein. As a specific embodiment, in order to form a seat shape having a three-dimensional curved surface as shown in FIG. 1 corresponding to a figure of a person who sits on a seat, the planar fastening body 4 is made of the planar fastening material 5 (a planar fastener commercially sold by a company named KURARE Inc.) and a slab-urethane foam 6 as the supporting material (the thickness is 5–15 mm, and the density is 0.018 g/cm$^3$–0.040 g/cm$^3$) having its appropriate thickness and density selected according to the feeling for sitting and the curved surface shape. In practice, in a seat shape having the depth of the curved surface of 10 mm, the planar fastening body 4 is made by fusing and laminating the supporting material of urethane foam having a thickness of 10 mm and a density of 0.034 g/cm$^3$ to the planar fastening material used. Also, according to the amount of curvature of a seat, the periphery of the planar fastening body 4 forms a space 10 apart 5–20 mm from the side 3 of the cushion material so that sitting thereon is more comfortable and the impregnation layer is not produced.

As mentioned above, in the present invention, the planar fastening body is integrally molded by shielding and clamping a wall for preventing entry of a foaming solution in a molding die of the cushion material, so that a cushion body structure which does not form an impregnation layer in the periphery of the planar fastening body and is soft and has good and uniform properties is realized. While the planar fastening body is an excellent means for mechanically connecting the skin material with the cushion material, by using this, if a hard impregnation layer is not produced in the periphery of the planar fastening body in the art, use of the planar fastening body can be broadly employed, and a high-quality car seat can be provided rapidly and economically without greatly increasing cost.

We claim:

1. A cushion structure for a vehicle seat comprising, a foamed cushion body having a main portion and upwardly extending side portions, said cushion body having a rising portion to form spaces between said rising portion and said side portions, a planar fastening body having a support layer having a constant thickness overlying said rising portion of said main portion of said cushion body and disposed between said side portions, a skin material positioned over said planar fastening body and said side portions and attached to said planar fastening body, the periphery of said fastening body projecting over said spaces to said side portions, an impregnation layer formed between and integrating said support layer and said rising portion of said cushion body, and a non-impregnation layer in said periphery of said fastening body being not impregnated by said foamed cushion body.

2. A cushion structure according to claim 1, wherein said periphery of said fastening body is not in contact with said side portions.

3. A cushion structure according to claim 1, wherein said non-impregnation layer is formed by the existence of an inverted L-shaped wall preventing entry of foamable solution which is vertically located in a position which divides an area mounting the planar fastening body in a mold for the cushion body.

4. A cushion structure according to claim 1, wherein said impregnation layer is in said support layer of said planar fastening body.

5. A vehicle seat cushion comprising, a foamed cushion body having a central body portion and raised upper side portions, a laminated planar fastening body having a lower support layer and an upper fastening material with a lower surface engaging said central body portion and ends disposed proximate to said raised upper side portions, an impregnation layer in said support layer formed between and integrating said lower surface of said planar fastening body and said central body portion of said foamed cushion body, a non-impregnation layer in said ends of said planar fastening body and extending into said lower surface of said planar fastening body, and a skin material positioned over said planar fastening body and said upper side portions of said foamed cushion body.

6. A vehicle seat cushion according to claim 5, wherein said ends of said planar fastening body are spaced from said raised upper side portions of said foamed cushion body.

7. A vehicle seat cushion according to claim 5, wherein a space is formed between said non-impregnation layer and said raised upper side portions and said central body portion of said foamed cushion body.

8. A vehicle seat cushion according to claim 5, wherein said skin material is attached to said planar fastening body.

9. A vehicle seat cushion according to claim 5, wherein said non-impregnation layer extends about the entire periphery of said planar fastening body.

10. A vehicle seat cushion comprising, a cushion body having a central body portion and raised upper side portions, a planar fastening body having a lower support layer with a lower surface affixed to a portion of said central body portion and ends disposed proximate to said raised upper side portions, a non-impregnation layer in said ends of said planar fastening body, and a skin material positioned over said planar fastening body and said upper side portions of said cushion body, wherein said planar fastening body is attached to said cushion body by the process of:

positioning said planar fastening body in a mold having a seating surface on an inner surface thereof, pouring a foamable composition for forming said cushion body into said mold, closing the mold, and foaming the foamable composition to form said cushion body and to impregnate said lower surface of said planar fastening body, while precluding impregnation of said ends of said planar fastening body by positioning walls in said mold interposed between said ends of said planar fastening body and said foamable composition.

11. A vehicle seat according to claim 10, wherein the process for attaching said planar fastening body to said cushion body further comprises the step of precluding impregnation of said ends of said planar fastening body and a portion of said lower surface of said planar fastening body by positioning walls interposed between said ends of said planar fastening body and a portion of said lower surface of said planar fastening body and said foamable composition.

* * * * *